United States Patent Office.

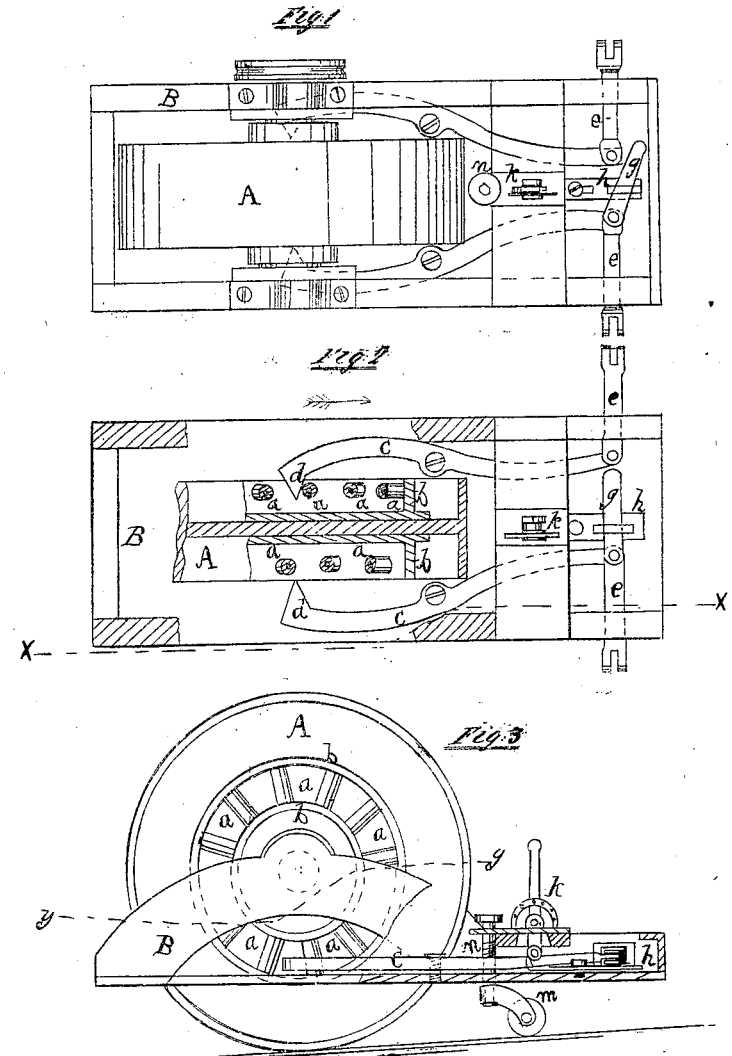

GEORGE G. LYMAN, OF INDEPENDENCE, IOWA, ASSIGNOR TO HIMSELF AND GEORGE P. LADD, OF MILWAUKEE, WISCONSIN.

Letters Patent No. 77,058, dated April 21, 1868.

IMPROVEMENT IN HARVESTERS.

The Schedule referred to in these Letters Patent and making part of the same.

TO ALL WHOM IT MAY CONCERN:

Be it known that I, GEORGE G. LYMAN, of Independence, in the county of Buchanan, and State of Iowa, have invented a new and improved Sickle-Driving Mechanism for Mowers and Reapers; and I do hereby declare that the following is a full, clear, and exact description thereof, which will enable those skilled in the art to make and use the same, reference being had to the accompanying drawings, forming part of this specification, in which—

Figure 1 is a top view of my invention, with the sickle-driving apparatus thrown out of gear.

Figure 2, a similar view, with the sickle-driving apparatus in gear, partly in section, taken in the line $y\,y$, fig. 3.

Figure 3, a side view, partly in vertical section, in the line $x\,x$, fig. 2.

Similar letters of reference indicate corresponding parts.

This invention relates to an improved mechanism for driving the sickles of reaping and mowing-machines and Indian-corn harvesters, and consists in a broad wheel or roller, on each side of which is a series of cams, arranged concentrically, which operate successively in the revolution of the roller upon the ends of levers, by causing them to vibrate rapidly, and thus give the necessary transverse motion to sickles attached in front of the carriage, adapted to reaping, mowing, or cutting Indian corn, as desired, and hereinafter described.

A is a broad driving-wheel, mounted on a carriage, B.

On each side of the driving-wheel A is a series of roller-cams, $a\,a$, set radially on their axes, within concentric flanges, $b\,b$, on the sides of the wheel, over which the main flange or tread of the wheel projects.

The roller-cams $a\,a$ are placed on the opposite sides of the wheel A, in the same circle, and at the same distance apart, but with their axes in alternating radial lines, or opposite the centres of the spaces between them respectively, to give alternate vibratory motion to levers or clicks $c\,c$, which are pivoted on the bottom of the carriage B, on each side of the driving-wheel A.

The levers $c\,c$ have pointed cam-heads, $d\,d$, which are operated on by the cam-rollers $a\,a$, to give the levers vibratory motion for working the sickles.

The levers extend forward to the front-platform end of the carriage, and in their ends are attached links or sickle-bars $e\,e$, which project at right angles in opposite directions, passing loosely through each side of the carriage-frame, and having knuckles on their ends for connecting with sickles, as required.

The vibrating-levers $c\,c$ are thrown in and out of gear with the driving-wheel cams $a\,a$ by means of a link, $g$, pivoted at one end to the end of one of the levers, and connected with a looped slide, $h$, in such manner, that, by moving the slide forward with a lever-attachment, $k$, the link $g$ disengages the levers $c\,c$, and by moving the slide $h$ backward, the levers $c\,c$ become engaged, as shown in the two positions, figs. 1 and 2.

When the link $g$ engages the front ends of the levers $c\,c$, they bear upon and act and react on each other alternately, in pushing the heads $d\,d$ in and out against the cam-rollers $a\,a$, and thus receive a rapid vibratory motion from the driving-wheel as it moves forward in the field.

Sickles for mowing, reaping, or cutting Indian corn are attached to the knuckles on the outer ends of the sickle-bars $e\,e$, on either side, as may be desired.

For regulating the distance of the sickles from the ground, the front end of the carriage is depressed or elevated more or less, by means of an adjustable roller or caster, $m$, set underneath the platform, and operated by a screw, $n$, to which it is attached.

Having described my invention, I claim as new, and desire to secure by Letters Patent—

1. The combination of the driving-wheel A, friction-rollers $a$, in the rim $b$ of said wheel, vibrating-levers $c$, sickle-bar $e$, and link $g$, as herein described, for the purpose specified.

2. The vibrating-levers $c\,c$, in combination with the sickle-bars $e\,e$, and the link $g$, arranged and operating substantially as and for the purpose specified.

GEORGE G. LYMAN.

Witnesses:
J. H. HAUSER,
S. P. McEWEN.